(12) United States Patent
Miyazaki

(10) Patent No.: US 12,192,485 B2
(45) Date of Patent: Jan. 7, 2025

(54) ON-VEHICLE DEVICE, MANAGEMENT SYSTEM, AND UPLOAD METHOD

(71) Applicant: DENSO TEN Limited, Kobe (JP)

(72) Inventor: Hideaki Miyazaki, Kobe (JP)

(73) Assignee: DENSO TEN Limited, Kobe (JP)

( * ) Notice: Subject to any disclaimer, the term of this patent is extended or adjusted under 35 U.S.C. 154(b) by 17 days.

(21) Appl. No.: 18/172,929

(22) Filed: Feb. 22, 2023

(65) Prior Publication Data

US 2023/0276059 A1  Aug. 31, 2023

(30) Foreign Application Priority Data

Feb. 28, 2022 (JP) ................................. 2022-029579

(51) Int. Cl.
*H04N 19/172* (2014.01)
*G06V 20/56* (2022.01)
*H04N 19/159* (2014.01)

(52) U.S. Cl.
CPC ........... *H04N 19/172* (2014.11); *G06V 20/56* (2022.01); *H04N 19/159* (2014.11)

(58) Field of Classification Search
CPC ...... H04N 19/172; H04N 19/159; H04N 7/18; H04N 21/4223; H04N 21/41422; H04N 21/44008; G06V 20/56
USPC ........................................................ 375/240
See application file for complete search history.

(56) References Cited

U.S. PATENT DOCUMENTS

| 2006/0015242 | A1* | 1/2006 | Yoshida | ................ | G08G 1/161 |
| | | | | | 701/96 |
| 2020/0334477 | A1* | 10/2020 | Aoi | ......................... | A61B 5/11 |

FOREIGN PATENT DOCUMENTS

JP  2010-108351 A  5/2010

* cited by examiner

*Primary Examiner* — Fitwi Y Hailegiorgis
(74) *Attorney, Agent, or Firm* — Oliff PLC

(57) ABSTRACT

An on-vehicle device uploads information concerning a vehicle to an external device with a predetermined period, and includes a processor that uploads, to an external device, trimming information where a target area is trimmed from image information that is captured by the vehicle.

4 Claims, 4 Drawing Sheets

ON-VEHICLE DEVICE, MANAGEMENT SYSTEM, AND UPLOAD METHOD

CROSS-REFERENCE TO RELATED APPLICATION(S)

This application is based upon and claims the benefit of priority to Japanese Patent Application No. 2022-029579, filed on Feb. 28, 2022, the entire contents of which are herein incorporated by reference.

FIELD

A disclosed embodiment(s) relate(s) to an on-vehicle device, a management system, and an upload method.

BACKGROUND

A management system has conventionally been provided that uploads an video that is captured by a dashboard camera that is mounted on a vehicle to a server device. For example, such a management system transmits an uploaded video to a preliminarily set address in a server device in a case where a shock is detected by a dashboard camera (see, for example, Japanese Laid-open Patent Publication No. 2010-108351)

However, a conventional technique has to upload all videos to a server device temporarily and has room for improvement in reducing an amount of data that are uploaded.

SUMMARY

An on-vehicle device according to an aspect of an embodiment is an on-vehicle device that uploads information concerning a vehicle to an external device with a predetermined period, wherein the on-vehicle device includes a processor that uploads, to an external device, trimming information where a target area is trimmed from image information that is captured by the vehicle.

BRIEF DESCRIPTION OF DRAWING(S)

Figure 1:
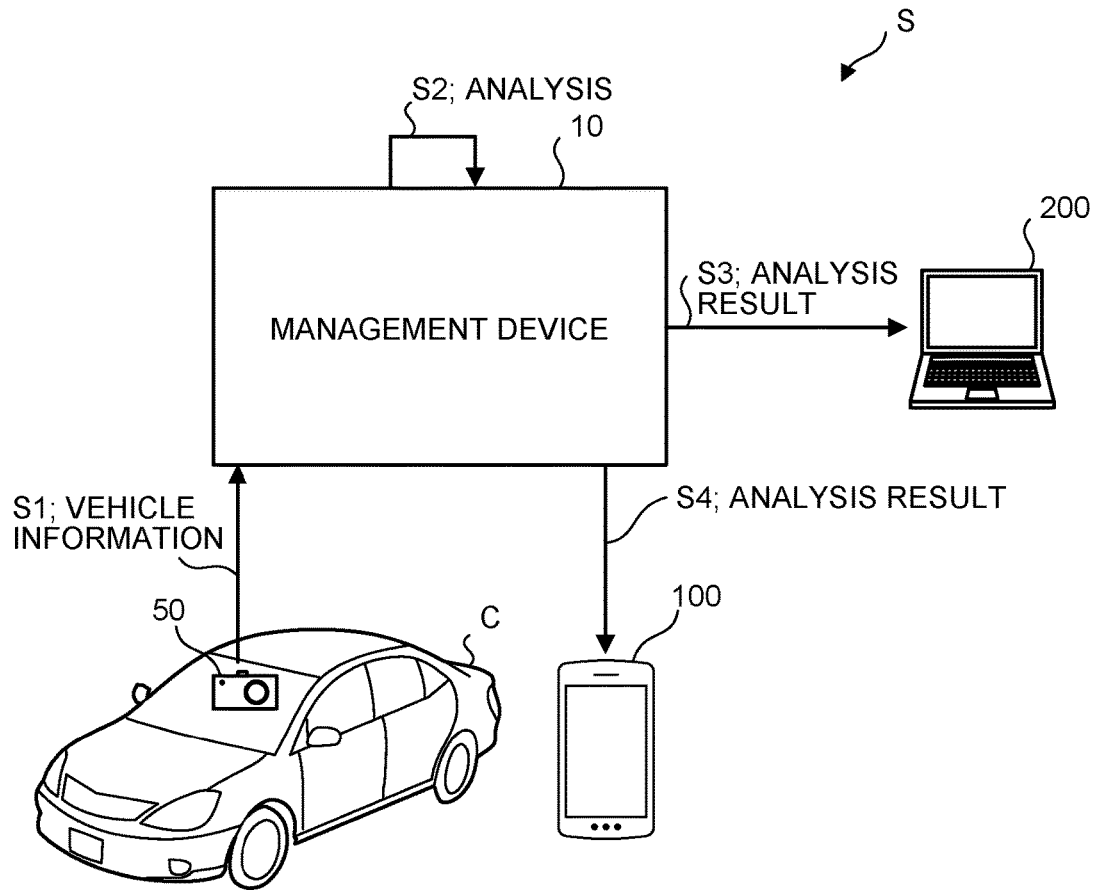
Figure 2:
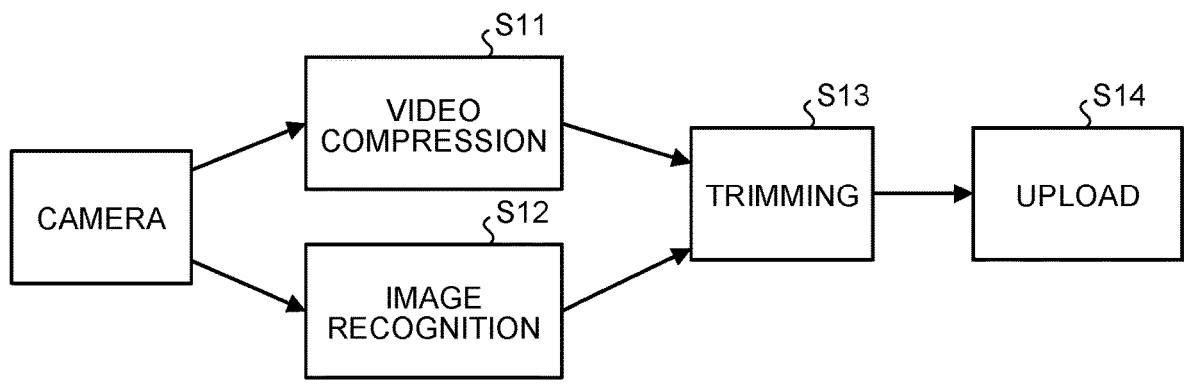
Figure 3:
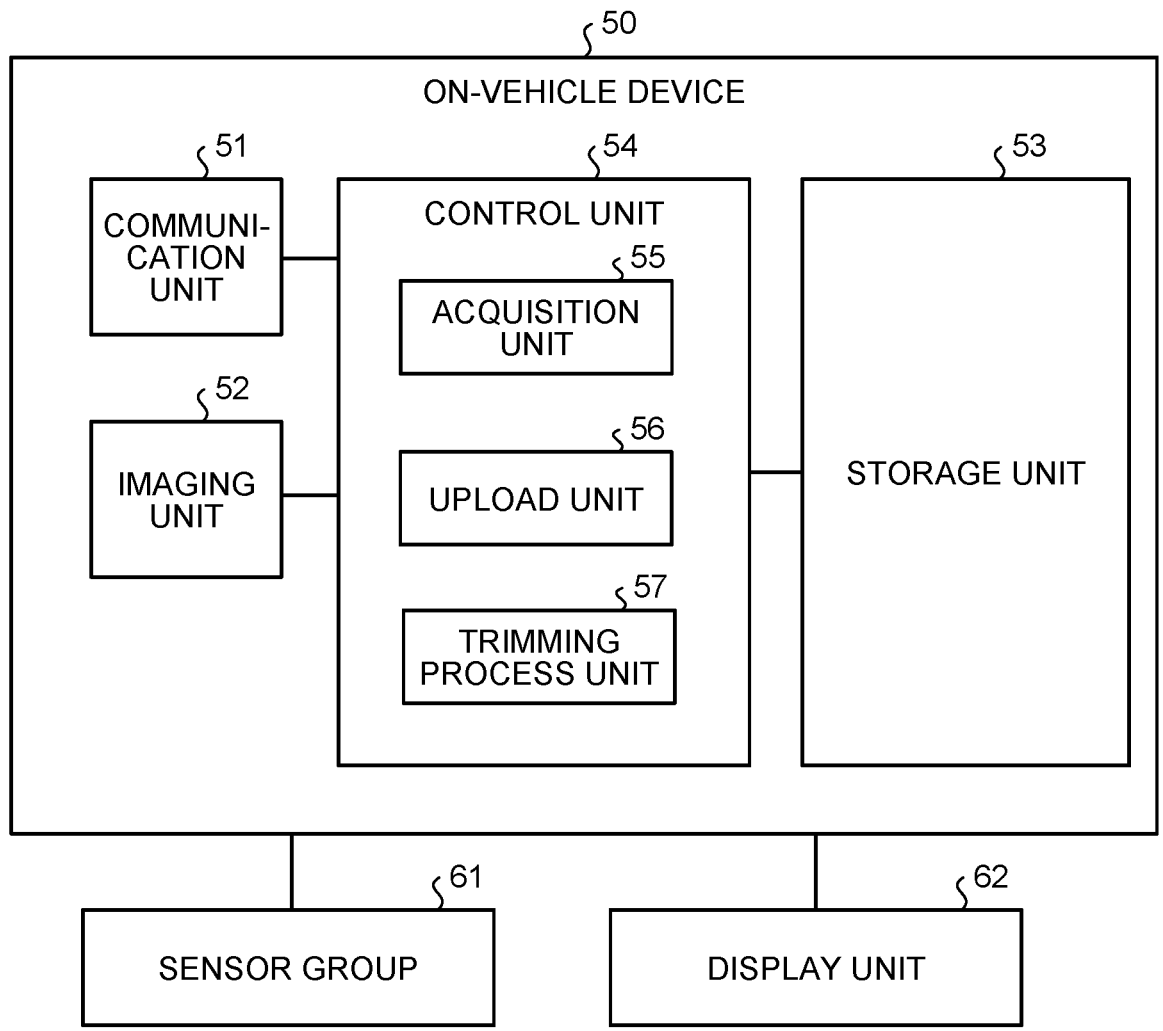
Figure 4:
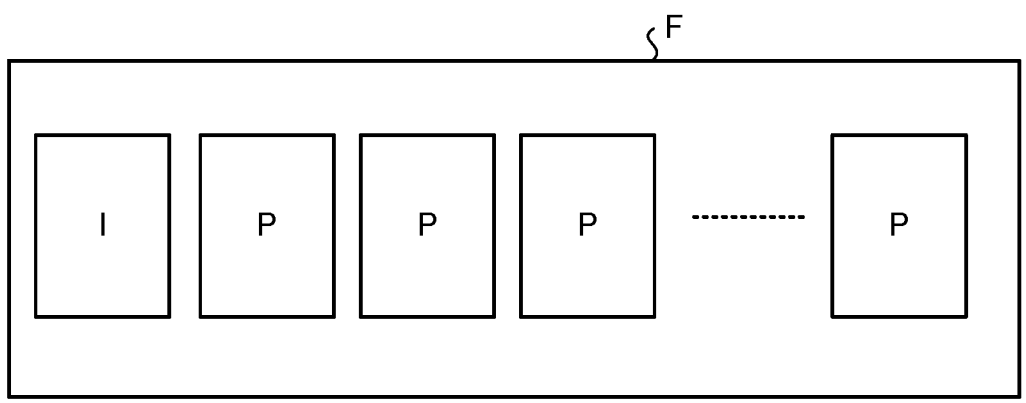
Figure 5:
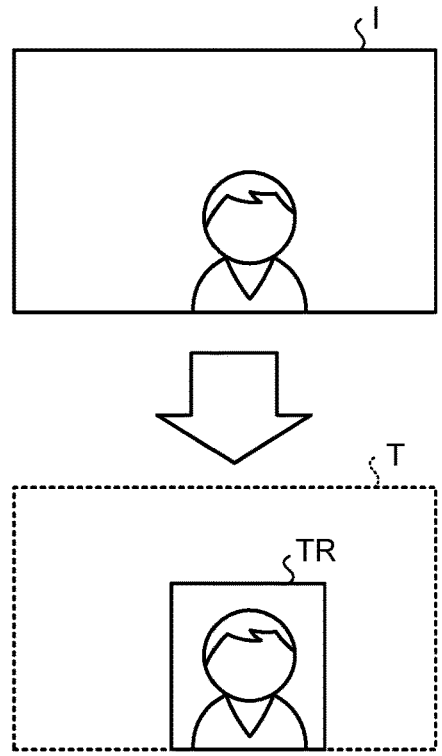
Figure 6:
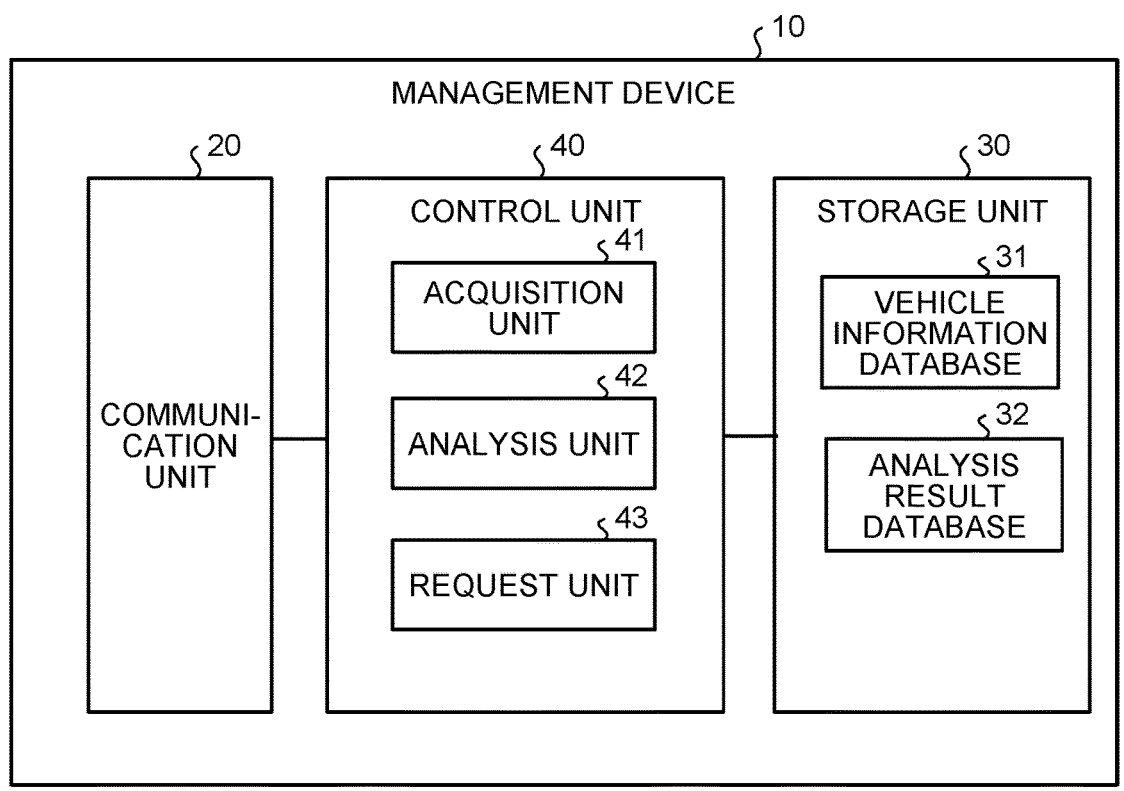
Figure 7:
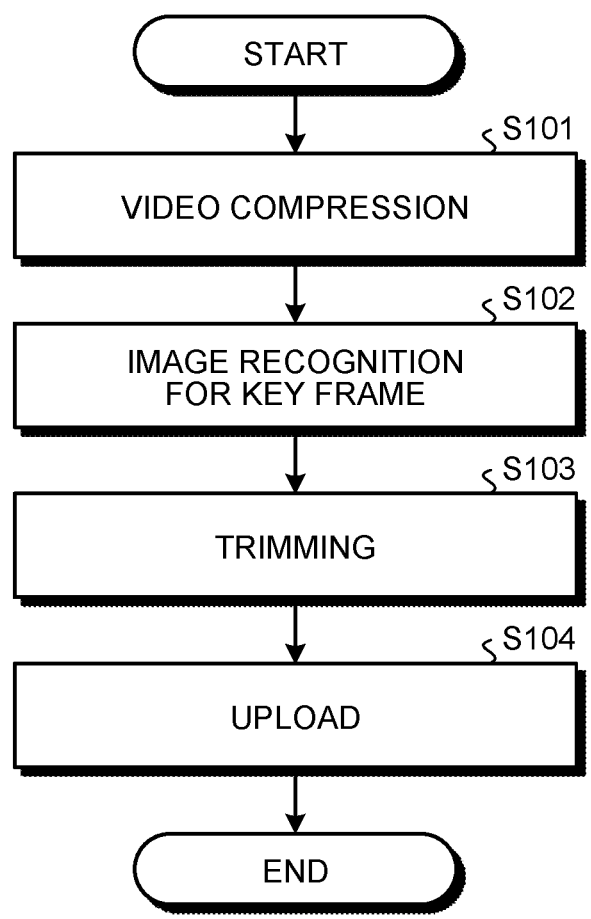

FIG. 1 is a diagram that illustrates an outline of a management system.
FIG. 2 is a diagram that illustrates an outline of an upload method.
FIG. 3 is a block diagram of an on-vehicle device.
FIG. 4 is a schematic diagram of a compressed file.
FIG. 5 is a diagram that illustrates an example of trimming information.
FIG. 6 is a block diagram of a management device.
FIG. 7 is a flowchart that illustrates a process procedure that is executed by an on-vehicle device.

DESCRIPTION OF EMBODIMENT(S)

Hereinafter, an embodiment(s) of an on-vehicle device, a management system, and an upload method as disclosed in the present application will be explained in detail with reference to the accompanying drawing(s). Additionally, the present invention is not limited by an embodiment(s) as illustrated below.

First, an outline of an on-vehicle device, a management system, and an upload method according to an embodiment will be explained by using FIG. 1 and FIG. 2. FIG. 1 is a diagram that illustrates an outline of a management system. FIG. 2 is a diagram that illustrates an outline of an upload method.

As illustrated in FIG. 1, a management system S according to an embodiment is, for example, a system that executes various types of analyses concerning driving such as safe driving and/or eco-driving of a driver. Furthermore, for example, the management system S is introduced into a delivery company that provides a delivery vehicle such as a taxi and/or a truck, as well as a business operator that has a business vehicle.

As illustrated in FIG. 1, the management system S according to an embodiment includes a management device 10 and an on-vehicle device 50. The on-vehicle device 50 is, for example, a dashboard camera with a communication function.

The on-vehicle device 50 uploads vehicle information that includes running information concerning a running state of a vehicle C and image information that is captured by such a vehicle C to the management device 10. Additionally, although image information is, for example, information concerning a captured image of a front side of a vehicle C, it may be information concerning a captured image of a periphery of such a vehicle C and/or an inside (for example, a driver seat) of such a vehicle C.

Furthermore, running information is, for example, information that is detected by various types of sensors that are provided to a vehicle C. For example, running information includes positional information, vehicle speed information, acceleration information, steering information, etc., of a vehicle C.

The management device 10 analyzes vehicle information that is acquired from each on-vehicle device 50 so as to evaluate a current situation of each vehicle C and/or driving of a driver. Additionally, for example, the management device 10 is configured as a cloud server that provides a cloud service through a network such as the Internet and/or a mobile phone line network.

Furthermore, as illustrated in FIG. 1, the management device 10 is connected to a driver terminal 100 and/or a manager terminal 200 through a network. The driver terminal 100 is a terminal that is possessed by a driver of each vehicle C and is a smartphone in an example as illustrated in FIG. 1.

The manager terminal 200 is a terminal that is possessed by a manager that manages a driving situation, etc., of each vehicle C, and is a notebook Personal Computer (PC) in an example as illustrated in FIG. 1. For example, the manager terminal 200 displays information that is notified of from the management device 10 so as to notify a manager of a current situation of each vehicle C, an evaluation result for each driver, etc.

Herein, an outline of information processing according to an embodiment will be explained by using FIG. 1. For example, the management device 10 acquires vehicle information from the on-vehicle device 50 with a predetermined period (step S1) and analyzes acquired vehicle information (step S2). For example, the management device 10 executes evaluation of a current situation of each vehicle C, driving of a driver, etc., based on each vehicle information.

Subsequently, the management device 10 notifies the manager terminal 200 of an evaluation result concerning a current situation of each vehicle C (for example, a current place and/or a running route of a vehicle C) and/or a driving evaluation (step S3).

For example, the management device 10 executes processes at such steps S1 to S3 periodically and notifies the driver terminal 100 of an analysis result (for example, a result of a driving evaluation) at any timing, for example, at a time of close of business, etc. (step S4).

In such a management system S, as all of videos that are captured by a vehicle C are uploaded, it is not preferable from a viewpoint of an amount of data and/or a communication fee. Hence, in an upload method according to an embodiment, a still image is uploaded instead of a video, so that further reduction of a processing load of the on-vehicle device 50 for such a still image that is uploaded is attained.

Specifically, in an upload method according to an embodiment, a still image is trimmed, so that reduction of an amount of data of such a still image that is uploaded is attained. Moreover, in an upload method according to an embodiment, a key frame of a compressed file that is used for video recording of a dashboard camera is usually trimmed, so that it is possible to reduce, for example, a process that prepares a still image for uploading separately.

For example, as illustrated in FIG. 2, in an upload method according to an embodiment, first, video compression is executed for image information that is input from a camera (step S11). For example, video compression is a compression method that is executed in inter-frame prediction, and is executed by generating a single key frame (an I-frame) that holds information of all frames and a compressed file that is composed of a plurality of P-frames that represent a difference from such a key frame or a previous frame.

Furthermore, in an upload method according to an embodiment, for example, an image recognition process is executed for a key frame as described above (step S12). For example, herein, an image recognition process is a process for recognizing a target object (for example, a vehicle in front, etc.) that appears in a key frame.

Subsequently, in an upload method according to an embodiment, trimming of a target range where a target object that is recognized from a key frame by an image recognition process appears, in a compressed file, is executed (step S13), and trimming information that is obtained as a result of trimming is uploaded (step S14).

That is, in an upload method according to an embodiment, information of a range where a target object appears in a key frame is uploaded, whereas information of a range where such a target object does not appear in such a key frame is not uploaded.

Furthermore, in an upload method according to an embodiment, a key frame that is used for video compression for compressing and storing image information is provided as a target for uploading. Hence, for example, it is possible to reduce a process that separately prepares image information for uploading, etc.

That is, in an upload method according to an embodiment, a still image that is uploaded is trimmed, so that it is possible to attain reduction of an amount of data, and further, a key frame is used for such a still image, so that it is possible to attain reduction of a processing load concerning uploading.

Next, a configuration example of an on-vehicle device 50 will be explained by using FIG. 3. FIG. 3 is a block diagram of the on-vehicle device 50. As illustrated in FIG. 3, the on-vehicle device 50 includes a communication unit 51, an imaging unit 52, a storage unit 53, and a control unit (a processor) 54. Furthermore, the on-vehicle device 50 is connected to a sensor group 61 and a display unit 62.

The sensor group 61 includes various types of sensors that detect, for example, a running state of a vehicle C. Such a sensor group 61 includes a vehicle speed sensor, a brake sensor, a steering angle sensor, an acceleration sensor, a position sensor, an obstacle detection sensor, etc.

The display unit 62 is a touch panel display that is mounted on a vehicle C. For example, the display unit 62 displays a video that is input from the on-vehicle device 50. Additionally, the display unit 62 may have a speaker so as to output a sound that is input from the on-vehicle device 50.

The communication unit 51 is realized by, for example, a Network Interface Card (NIC), etc. The communication unit 51 is connected to a predetermined communication network so as to be two-way-communicable and executes transmission/receipt of information, with a management device 10, etc.

The imaging unit 52 includes various types of imaging elements and captures an image of a periphery of a vehicle C. Additionally, the on-vehicle device 50 may be configured to have the imaging unit 52 that captures an image of an inside (for example, a driver) of a vehicle.

The storage unit 53 is a storage unit that is composed of a storage device such as, for example, a non-volatile memory, a data flash, and/or a hard disk drive, and stores various types of information that is input from the imaging unit 52 and the sensor group 61.

The control unit 54 includes an acquisition unit 55, an upload unit 56, and a trimming process unit 57, and includes a computer that has, for example, a Central Processing Unit (CPU), a Read Only Memory (ROM), a Random Access Memory (RAM), a hard disk drive, an input/output port, etc., and/or various types of circuits.

A CPU of a computer reads and executes a program that is stored in, for example, a ROM, so as to function as the acquisition unit 55, the upload unit 56, and the trimming process unit 57 of the control unit 54.

The acquisition unit 55 acquires vehicle information that includes image information that is captured by the imaging unit 52 and various types of driving information that is input from the sensor group 61. Furthermore, the acquisition unit 55 stores acquired vehicle information in the storage unit 53.

Furthermore, the acquisition unit 55 generates a compressed file where a plurality of pieces of image information are compressed based on a difference between previous and next ones, and stores it in the storage unit 53. FIG. 4 is a schematic diagram of a compressed file. As illustrated in FIG. 4, for example, a compressed file F is composed of a single I-frame (a key frame) and a plurality of P-frames.

An I-frame is a frame that holds information of all frames and a P-frame is a frame that holds information of a difference from a previous frame. That is, a compressed file F is a file where information is compressed between frames. The acquisition unit 55 generates a compressed file F, so that it is possible to reduce an amount of data of image information that is stored in the storage unit 53.

By returning to an explanation for FIG. 3, the upload unit 56 will be explained. The upload unit 56 uploads vehicle information that is acquired by the acquisition unit 55 to the management device 10 with a predetermined period. Herein, for image information that is uploaded, the upload unit 56 uploads trimming information that is generated by the trimming process unit 57 as described later.

Vehicle information that is uploaded by the upload unit 56 at an upload timing includes running information and trimming information that are newly obtained after previous uploading.

Furthermore, the upload unit 56 uploads vehicle information with a type and a time period that are specified by the management device 10 to the management device 10 in a case where a request is provided from the management device 10. In such a case, for example, the upload unit 56 uploads a video that is captured within a time period that is specified by the management device 10 to the management device 10.

That is, the upload unit 56 uploads, for running information, information for all time periods, and uploads, for image information, a still image that is captured at an upload timing.

Then, the upload unit 56 uploads a video within a specified time period to the management device 10, for example, in a case where a request is provided from the management device 10. Herein, for example, the upload unit 56 may upload, for example, a key frame before trimming (all information concerning a key frame) to the management device 10, depending on a request from the management device 10. Thus, a whole of a key frame is uploaded, so that it is possible for the management device 10 or a manager to recognize such a whole of a key frame.

The trimming process unit 57 generates trimming information where a target area is trimmed from image information that is captured by a vehicle C. For example, the trimming process unit 57 receives a key frame from the acquisition unit 55 and determines a target area by an image recognition process for such a received key frame.

Herein, a specific example of a process that is executed by the trimming process unit 57 will be explained by using FIG. 5. FIG. 5 is a diagram that illustrates an example of trimming information. Additionally, although a case where trimming information is generated from information of a captured image of an inside of a vehicle will be explained herein, it is also possible to generate trimming information from information of a captured image of an outside of a vehicle. Furthermore, although a driver is explained as a target object and provided as an example thereof herein, it is possible to change setting of such a target object freely.

For example, as illustrated in FIG. 5, the trimming process unit 57 recognizes a target object (a driver, herein) by an image recognition process for a key frame I. The trimming process unit 57 sets an area where a target object appears as a target area TR, and generates trimming information where such a target area TR is trimmed.

That is, trimming information T is information where information concerning an area other than a target area TR is excluded from a key frame I. Hence, trimming information T is uploaded, so that it is possible to reduce an amount of data that are uploaded, as compared with a case where a whole of a key frame I is uploaded. Additionally, for example, in a case where it is determined that a target object does not appear in a key frame I, an upload process concerning such a key frame I is skipped and notification is provided in such a manner that such a target object does not appear therein.

Additionally, for example, in a case where a plurality of key frames I are present before a next upload period, a single key frame I may be selected based on a predetermined condition so as to generate trimming information T. Herein, a predetermined condition is provided as, for example, a target object appearing in a key frame I most clearly, etc.

Subsequently, a configuration example of a management device 10 will be explained by using FIG. 6. As illustrated in FIG. 6, the management device 10 according to an embodiment includes a communication unit 20, a storage unit 30, and a control unit 40.

The communication unit 20 is realized by, for example, a Network Interface Card (NIC), etc. The communication unit 20 is connected to a predetermined communication network so as to be two-way-communicable and executes transmission/receipt of information, with an on-vehicle device 50, etc.

The storage unit 30 is a storage unit that is composed of a storage device such as, for example, a non-volatile memory, a data flash, and/or a hard disk drive. As illustrated in FIG. 6, the storage unit 30 has a vehicle information database 31 and an analysis result database 32.

The vehicle information database 31 is a database that stores vehicle information that is acquired from each on-vehicle device 50. The analysis result database 32 is a database that stores an analysis result for vehicle information that is acquired from each on-vehicle device 50.

The control unit 40 includes an acquisition unit 41, an analysis unit 42, and a request unit 43, and includes a computer that has, for example, a Central Processing Unit (CPU), a Read Only Memory (ROM), a Random Access Memory (RAM), a hard disk drive, an input/output port, etc., and/or various types of circuits.

A CPU of a computer reads and executes a program that is stored in, for example, a ROM, so as to function as the acquisition unit 41, the analysis unit 42, and the request unit 43 of the control unit 40.

The acquisition unit 41 acquires vehicle information of each vehicle C from each on-vehicle device 50 with a predetermined period, and further, acquires vehicle information that is uploaded from the on-vehicle device 50, based on a request that is provided by the request unit 43 as described later. The acquisition unit 41 stores acquired vehicle information in the vehicle information database 31.

The analysis unit 42 analyzes vehicle information that is acquired by the acquisition unit 41. For example, the analysis unit 42 analyzes a current situation of each vehicle C or a driver thereof. Furthermore, for example, the analysis unit 42 evaluates driving that is executed by a driver of each vehicle C as a part of analysis.

For example, an analysis result that is provided by the analysis unit 42 is stored in the analysis result database 32 and a manager terminal 200 (see FIG. 1) is also notified thereof.

The request unit 43 requests vehicle information from the on-vehicle device 50, based on an analysis result that is provided by the analysis unit 42. Additionally, the request unit 43 may request, from the on-vehicle device 50, vehicle information with an information type and a time period that are specified by the manager terminal 200 that is notified of an analysis result that is provided by the analysis unit 42, or may request vehicle information autonomously. In a case where vehicle information is requested autonomously, for example, whether or not such vehicle information satisfies a predetermined condition is determined and vehicle information that is linked to such a condition is requested from the on-vehicle device 50.

Next, a process procedure that is executed by an on-vehicle device 50 according to an embodiment will be explained by using FIG. 7. FIG. 7 is a flowchart that illustrates a process procedure that is executed by the on-vehicle device 50.

As illustrated in FIG. 7, the on-vehicle device 50 executes video compression (step S101) and executes image recognition for a key frame I (step S102). Subsequently, the on-vehicle device 50 sets a target area TR and executes trimming based on a result of image recognition for a key frame I (step S103).

Then, the on-vehicle device 50 uploads trimming information where trimming is executed for a key frame I (step S104). Then, the on-vehicle device 50 ends a process.

As described above, an on-vehicle device 50 according to an embodiment is an on-vehicle device that uploads vehicle information concerning a vehicle C to a management device 10 (an example of an external device) with a predetermined period, and includes a control unit 54 (an example of a processor) that uploads, to such a management device 10, trimming information T where a target area is trimmed from image information that is captured by the vehicle C. Therefore, it is possible for an on-vehicle device 50 according to an embodiment to reduce an amount of data that are uploaded.

Additionally, although a case where the management device 10 is a server or a cloud system that aggregates vehicle information from each on-vehicle device 50 has been explained in an embodiment as described above, this is not limiting. A part or all of functions of the management device 10 may be provided to the on-vehicle device 50.

According to an aspect of an embodiment, it is possible to reduce an amount of data that are uploaded.

Appendix (1): An on-vehicle device that uploads information concerning a vehicle to an external device with a predetermined period, wherein the on-vehicle device includes a processor that uploads, to an external device, trimming information where a target area is trimmed from image information that is captured by the vehicle.

Appendix (2): The on-vehicle device according to Appendix (1), wherein the processor uploads the trimming information within a time period that is specified by the external device or the image information before trimming, depending on a request that is provided by the external device, after uploading the trimming information.

Appendix (3): The on-vehicle device according to Appendix (1) or (2), wherein the processor identifies the target area where a target object that is specified by an image recognition process for the image information appears, and generates trimming information.

Appendix (4): The on-vehicle device according to Appendix (1), (2), or (3), wherein the processor generates a compressed file where a plurality of pieces of image information are compressed based on a difference between previous and next ones, and uploads the trimming information where a key frame in the compressed file is trimmed.

Appendix (5): A management system, comprising the on-vehicle device according to any one of Appendices (1) to (4), and a management device that aggregates and manages information that is uploaded from the on-vehicle device.

Appendix (6): An upload method that uploads information concerning a vehicle to an external device with a predetermined period, wherein the upload method uploads, to an external device, trimming information where a target area is trimmed from image information that is captured by the vehicle.

It is possible for a person(s) skilled in the art to readily derive an additional effect(s) and/or variation(s). Hence, a broader aspect(s) of the present invention is/are not limited to a specific detail(s) and a representative embodiment(s) as illustrated and described above. Therefore, various modifications are possible without departing from the spirit or scope of a general inventive concept that is defined by the appended claim(s) and an equivalent(s) thereof.

What is claimed is:

1. An on-vehicle device, comprising
a processor configured to:
   generate, from captured image information, a compressed file that includes an I-frame and a series of P-frames;
   identify a target object area in the I-frame by an image recognition process;
   trim the target object area from the I-frame to generate trimming information; and
   upload the trimming information to an external device.

2. The on-vehicle device according to claim 1, wherein the processor is further configured to:
   upload the trimming information within a time period that is specified by the external device or the image information before trimming, depending on a request that is provided by the external device, after uploading the trimming information.

3. A management system, comprising:
   the on-vehicle device according to claim 1; and
   a management device that aggregates and manages information that is uploaded from the on-vehicle device.

4. An upload method, comprising:
   generating, from captured image information, a compressed file that includes an I-frame and a series of P-frames;
   identifying a target object area in the I-frame by an image recognition process;
   trimming the target object area from the I-frame to generate trimming information; and
   uploading the trimming information to an external device.

* * * * *